A. F. RENKEN.
GOPHER TRAP.
APPLICATION FILED DEC. 31, 1912.
1,065,838.
Patented June 24, 1913.
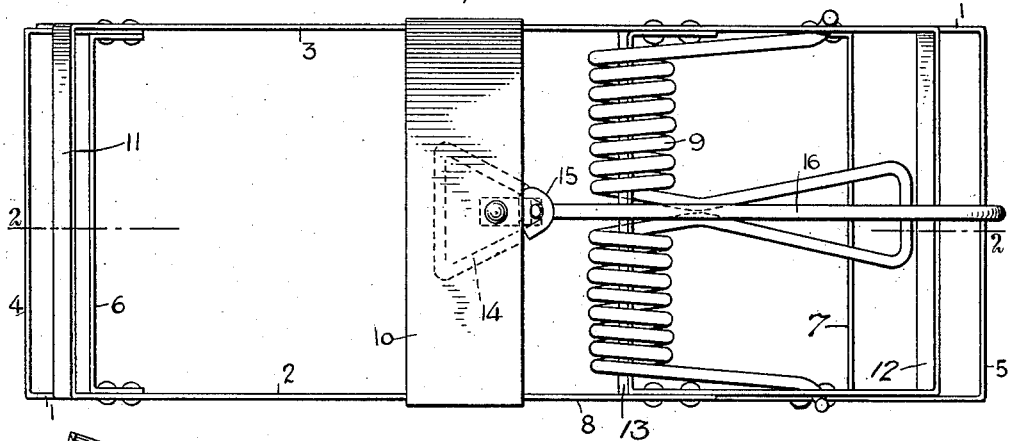
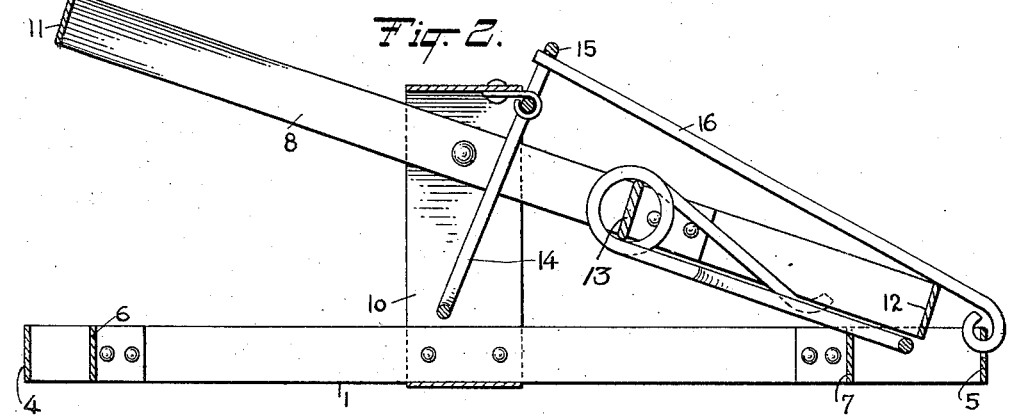
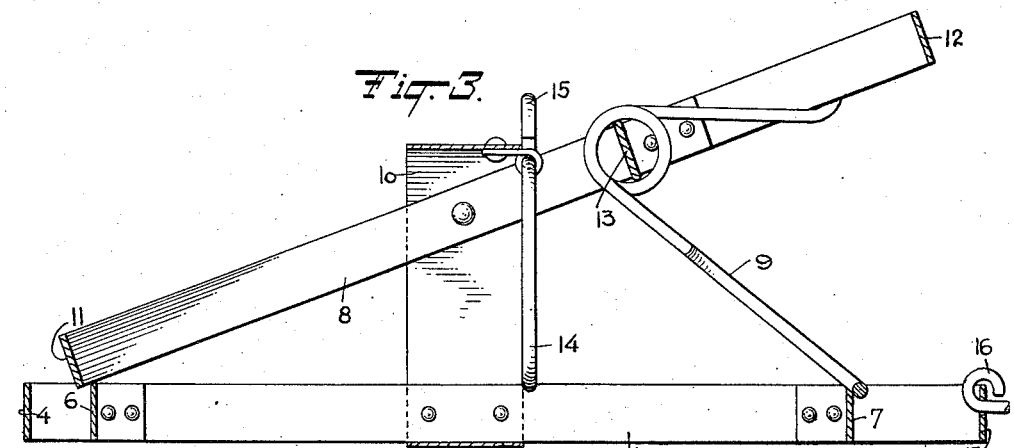
WITNESSES
George Bambay
A. L. Kitchin
INVENTOR
Anton F. Renken
BY
ATTORNEYS

UNITED STATES PATENT OFFICE.

ANTON F. RENKEN, OF KRAMER, NEBRASKA.

GOPHER-TRAP.

1,065,838.

Specification of Letters Patent.

Patented June 24, 1913.

Application filed December 31, 1912. Serial No. 739,474.

*To all whom it may concern:*

Be it known that I, ANTON F. RENKEN, a citizen of the United States, and a resident of Kramer, in the county of Lancaster and State of Nebraska, have invented a new and Improved Gopher-Trap, of which the following is a full, clear, and exact description.

This invention relates to improvements in traps, and particularly traps for catching rodents of any kind, as for instance, pocket gophers, ground squirrels, and similar animals.

The object in view is to provide a trap which cannot be readily set off by the animal unless the animal is within the trap and in position to be caught thereby.

A further object of the invention is to provide a trap substantially rectangular and arranged with the trip mechanism an appreciable distance from the end designed to catch the animal, so that the animal engaging the end may be placed into a hole or other place so as to prevent the animal from escaping without passing through the trap.

In carrying out the objects of the invention, a base framework is provided, to which is connected a central upright. Pivotally mounted on the central upright is a swinging frame pressed by a spring at one end and formed so that the opposite end will engage part of the base frame after the trap has been set off. In setting the trap, the swinging or pivotally mounted frame is moved against the action of the spring so that the end normally engaging the base frame will be moved upwardly therefrom and held in an elevated position as long as the trap is set. A catch mechanism is associated with the swinging frame for holding the same in a set position until something strikes against a suitable trigger for releasing the spring, whereupon the elevated swinging frame will move quickly down against the base and catch and hold any animal attempting to pass.

A practical embodiment of the invention is represented in the accompanying drawings forming a part of this specification, in which similar characters of reference indicate corresponding parts in all the views.

Figure 1 is a top plan view of a trap embodying the invention; Fig. 2 is a longitudinal vertical section through Fig. 1, approximately on the line 2—2; and Fig. 3 is a similar section to that shown in Fig. 1, except that the trap has been shown as tripped.

Referring to the accompanying drawings by numerals, 1 indicates a base formed preferably of sheet metal and constructed preferably rectangular in shape, whereby sides 2 and 3 are provided and end members 4 and 5. Cross bars 6 and 7 are also provided for acting in connection with a swinging frame 8, and also for acting with spring 9. The frame 8 is pivotally mounted to a frame 10 rigidly secured to the base frame 1. The frame 8 is made substantially rectangular preferably, though, if desired, the same may be made some other shape, provided cross bars or end members 11 and 12 are provided that co-act with cross bars 6 and 7. A bracing bar 13 is also provided, which acts as a bearing retaining member for the spring 9 so that the spring may be held in proper place for acting on the frame 8, and on the cross bar 7 in order that the frame 8 may be given a continuous tendency to move to the position shown in Fig. 3.

In addition to frame 8 being pivotally mounted on the cross frame 10, a trigger 14 is pivotally connected with the frame 10 so that a comparatively small eyelet 15 will project a short distance above frame 10 and a comparatively large depending portion will project into the space inclosed by the frame 10, whereby anything passing longitudinally through the frame 10 will cause the trigger to be moved and thus release a pivotally mounted arm 16 designed to hold frame 8 in an elevated or set position, as shown in Fig. 2.

In use, the trap may be placed at any point, but preferably the trap is placed with the end 4 extended into the hole containing the animal to be caught, end 11 being also extended into the hole but not in contact with the walls thereof. When the trap is set and arranged in the hole in this manner, and the animal attempts to escape, it must strike against trigger 14 which will release spring 9 and will result in catching the animal between end 11 and cross bar 6 where the animal is held. It will be evident that spring 9 may be made so as to give any desired pressure in order to hold any animal which may be caught, or, if desired, may be made sufficiently strong to kill the animal when struck.

Having thus described my invention, I claim as new and desire to secure by Letters Patent:—

1. In a trap of the class described, a base, a support connected with substantially the center of said base, a swinging striking member, means for pivotally connecting the same with said central base, a cross bar rigidly secured to said swinging striking member, a spring encircling said cross bar with one end engaging said swinging striking member and the other end engaging said base, for maintaining said swinging striking member under tension at all times and for tending to move the swinging striking member to a predetermined position when moved therefrom, a trigger formed with an enlarged body portion and an eyelet at the upper end, means for pivotally connecting said trigger to said central base, and a locking lever pivotally connected with said base and adapted to overlap said swinging striking member for holding the same in a set position, said locking lever being adapted to be inserted into the eyelet in said trigger for holding the same normally against movement whereby when said body is moved in a predetermined direction, said eyelet will be moved out of engagement with said locking lever for releasing said swinging striking member.

2. In a trap of the class described, a base, a support connected centrally of said base, a pivotally mounted striking member connected with said support, said striking member having its pivotal connection arranged centrally thereof so that when one end is moved downwardly against said base, the other end will be moved away from said base, a spring mounted on said striking member at one end and acting against the same and against said base whereby the end of said striking member carrying said spring is given a continual tendency to remain out of contact with said base, a locking arm pivotally connected with said base and arranged to overlap the end of said striking member carrying said spring for locking the same in contact with said base, and a trigger for holding said locking lever against movement, said trigger having one end projecting to a space immediately above said base whereby an animal passing from one end of the base to the other will release said trigger and said locking lever, this resulting in said spring actuating said striking member.

In testimony whereof I have signed my name to this specification in the presence of two subscribing witnesses.

ANTON F. RENKEN.

Witnesses:
F. A. THOMPSON,
E. S. MAXWELL.

Copies of this patent may be obtained for five cents each, by addressing the "Commissioner of Patents, Washington, D. C."